US011100433B2

(12) United States Patent
Voelz et al.

(10) Patent No.: US 11,100,433 B2
(45) Date of Patent: Aug. 24, 2021

(54) VALET PARKING METHOD

(71) Applicant: Robert Bosch GmbH, Stuttgart (DE)

(72) Inventors: Benjamin Voelz, Leonberg (DE);
Christian Heigele, Winterthur (CH);
Holger Mielenz, Ostfildern (DE);
Michael Scherl, Bietigheim (DE);
Philipp Lehner, Muehlacker (DE)

(73) Assignee: Robert Bosch GmbH, Stuttgart (DE)

( * ) Notice: Subject to any disclaimer, the term of this patent is extended or adjusted under 35 U.S.C. 154(b) by 443 days.

(21) Appl. No.: 15/538,896

(22) PCT Filed: Jan. 19, 2016

(86) PCT No.: PCT/EP2016/050955
§ 371 (c)(1),
(2) Date: Jun. 22, 2017

(87) PCT Pub. No.: WO2016/120118
PCT Pub. Date: Aug. 4, 2016

(65) Prior Publication Data
US 2018/0012156 A1      Jan. 11, 2018

(30) Foreign Application Priority Data

Jan. 26, 2015   (DE) .................... 10 2015 201 205.0

(51) Int. Cl.
*G06Q 10/04*        (2012.01)
*G08G 1/14*         (2006.01)
(Continued)

(52) U.S. Cl.
CPC ............ *G06Q 10/047* (2013.01); *B60L 53/30* (2019.02); *B60L 58/10* (2019.02); *B60W 30/06* (2013.01);
(Continued)

(58) Field of Classification Search
CPC .... G08G 1/14; G08G 1/146; B60K 2370/175; B61L 2210/02; G01S 2013/9314;
(Continued)

(56) References Cited

U.S. PATENT DOCUMENTS 6,426,708 B1    7/2002  Trajkovic et al.
8,022,674 B2 *  9/2011  Miura .................. B60W 10/26
                                            320/132
(Continued)

FOREIGN PATENT DOCUMENTS

CN      101218127 A    7/2008
CN      103241239 A    8/2013
(Continued)

OTHER PUBLICATIONS

"Estimating the range of electric vehicles," by North Carolina State University, Oct. 22, 2014 (Year: 2014).*
(Continued)

*Primary Examiner* — George Chen
*Assistant Examiner* — Brian Adams Heflin
(74) *Attorney, Agent, or Firm* — Norton Rose Fulbright US LLP; Gerard Messina

(57) ABSTRACT

A method for the optimized use of a parking area. Vehicles which are to be parked on the parking area are each assigned a parking space, the vehicles navigating to the respective assigned parking space, in particular autonomously. Furthermore, vehicles may carry out a change of the parking space in order to enable an improved use of the available parking area or a faster availability of the vehicle, whereby overall an optimized use of the parking area is achieved. Initially, an available range of the respective vehicles is ascertained, and the assignment of the respective parking space and/or a possible change of the parking space are made dependent on the available range of the individual vehicles. The available
(Continued)

a)                                    b)

range of a vehicle is in particular described by a residual fuel amount or a charge state of the vehicle.

8 Claims, 2 Drawing Sheets

(51) Int. Cl.
| | | |
|---|---|---|
| *G05D 1/02* | (2020.01) | |
| *G06Q 50/30* | (2012.01) | |
| *B60W 30/06* | (2006.01) | |
| *B60L 58/10* | (2019.01) | |
| *B60L 53/30* | (2019.01) | |

(52) U.S. Cl.
CPC ......... *G05D 1/0217* (2013.01); *G05D 1/0225* (2013.01); *G05D 1/0285* (2013.01); *G06Q 10/043* (2013.01); *G06Q 50/30* (2013.01); *G08G 1/146* (2013.01); *B60L 2260/52* (2013.01); *Y02T 10/70* (2013.01); *Y02T 10/7072* (2013.01); *Y02T 90/12* (2013.01); *Y02T 90/14* (2013.01)

(58) Field of Classification Search
CPC ...... G06K 9/00812; G02F 1/113; G01J 5/028; G06T 2207/30264; G06Q 10/043; G06Q 10/047; G06Q 50/30; B06L 53/30; B60L 58/10; B60L 53/30; Y02T 10/7005; Y02T 10/7072; Y02T 10/705; G05B 2219/31012; G05B 2219/40336
See application file for complete search history.

(56) References Cited

U.S. PATENT DOCUMENTS

| | | | | |
|---|---|---|---|---|
| 8,694,232 B2* | 4/2014 | Kono | ............... | G08G 1/096833 340/995.24 |
| 2006/0278449 A1* | 12/2006 | Torre-Bueno | ............ | B60K 6/46 180/65.29 |
| 2011/0127944 A1* | 6/2011 | Saito | ....................... | B60L 53/11 320/101 |
| 2012/0188100 A1 | 7/2012 | Min et al. | | |
| 2015/0073645 A1* | 3/2015 | Davidsson | ......... | B62D 15/0285 701/23 |
| 2015/0149265 A1* | 5/2015 | Huntzicker | ........... | B60W 30/06 705/13 |
| 2016/0245662 A1* | 8/2016 | Rajagopalan | ...... | G01C 21/3469 |
| 2017/0212511 A1* | 7/2017 | Paiva Ferreira | ....... | G08G 1/143 |
| 2019/0012631 A1* | 1/2019 | Chatani | .................. | G06Q 50/28 |
| 2020/0258385 A1* | 8/2020 | Mahajan | ................ | G08G 1/143 |

FOREIGN PATENT DOCUMENTS

| | | | |
|---|---|---|---|
| CN | 103269107 A | 8/2013 | |
| CN | 203420504 U | 2/2014 | |
| DE | 19519107 C1 | 4/1996 | |
| DE | 202009000259 U1 | 3/2009 | |
| DE | 102008055881 A1 | 5/2010 | |
| DE | 102010003887 A1 | 10/2011 | |
| DE | 102010033215 A1 | 2/2012 | |
| DE | 102011088809 A1 | 6/2013 | |
| DE | 102012024865 A1 | 6/2014 | |
| EP | 2567371 A1 | 3/2013 | |
| WO | 2010060720 A2 | 6/2010 | |
| WO | WO-2010060720 A2 * | 6/2010 | ............... B60L 3/12 |
| WO | 2012058022 A2 | 5/2012 | |

OTHER PUBLICATIONS

"Car relocation for carsharing service:Comparison of CPLEX and Greedy Search," by Rabih Zakaria, Laurent Moalic, Aleandre Caminada, and Mohammad Dib (2014) (Year: 2014).*

"Design of Genetic Algorithm-based Parking System for an Autonomous Vehicle," by Xing Xiong and Byung-Jae Choi, School of Electronic Engineering, International Journal of Fuzzy Logic and Intelligent Systems, vol. 9, No. 4, pp. 275-280 (Dec. 2009) (Year: 2009).*

"The Electric Vehicle-Routing Problem with Time Windows and Recharging Stations," by Michael Schneider, Andreas Stenger, and Dominik Goeke, Transportation Science, vol. 48, No. 4, Nov. 2014, pp. 500-520 (Year: 2014).*

"Electric vehicle charging and routing management via multi-infrastructure data fusion," by Christopher Decker, Rochester Institute of Technology, Oct. 1, 2012 (Year: 2012).*

International Search Report dated Apr. 14, 2016, of the corresponding International Application PCT/EP2016/050955 filed Jan. 19, 2016.

* cited by examiner

VALET PARKING METHOD

BACKGROUND INFORMATION

Valet parking systems are fully automatic driver assistance systems for parking facilities which, usually by communicating with a parking facility management system (e.g., a server), make it possible to drive a vehicle from an entrance area of a parking facility to a parking area without the action of a driver in order to permanently park the vehicle there. The advantage of valet parking systems is that, in contrast to automatic parking facilities including conveying systems, existing facilities do not have to be further equipped to afford the driver the enhanced convenience and freedom from having to search for a parking spot. Furthermore, convention systems allow the driver to call his or her vehicle from a distance, so that it returns fully automatically to a predefined pick-up position, where the driver may take charge of it.

Various methods for using a parking area are available. Conventionally, vehicles which are to be parked on the parking area are each assigned a parking space, the vehicles autonomously navigating to the respective assigned parking space. German Patent Application No. DE 10 2010 033 215 A1, for example, describes a method for supporting a parking process in a parking garage using a parking system in a vehicle. To enable simplified and rapid location of a free parking spot, the parking system is provided pieces of information about the parking garage upon entry and/or during the stay, the parking system generating and outputting control data for the vehicle by evaluating the provided pieces of information about the parking garage, the vehicle being moved automatically through the parking garage based on the control data and/or the control data being output as navigation instructions to the driver.

Furthermore, in conventional devices, transfer of a vehicle takes place based on a charging need, and thus an available range of the vehicle. The assignment of a parking option as a function of the available range of an electric vehicle is also known.

German Patent Application No. DE 20 2009 000 259 U1 describes a charge assistance system including a transceiver unit which allows a communication with a charging location system, a display unit on which data are visually and/or acoustically displayed to the user, an input unit with which the user is able to enter data into the charge assistance system, and a processing unit which selects charging locations taking predefinable parameters into consideration.

German Patent Application No. DE 10 2011 088 809 A1 describes a method for requesting a piece of routing information to a parking option having a charging option for charging an electric vehicle. A request signal for requesting the routing information using the at least one additional need and a location and a range of the electric vehicle is transmitted.

SUMMARY

It is an object of the present invention to select the target position of an entering vehicle in such a way that the parking capacity of a parking area is optimized, with parking in "second and higher rows" being implemented as a solution approach, and thus frequent re-parking of a vehicle possibly becoming necessary.

A method for the optimized use of a parking area is provided. Vehicles which are to be parked on the parking area are each assigned a parking space, the vehicles in particular autonomously navigating to the respective assigned parking space. Furthermore, vehicles may carry out a change of the parking space in order to enable an improved use of the available parking area or a faster availability of the vehicle, whereby overall an optimized use of the parking area is achieved. According to the present invention, initially an available range of the respective vehicles is ascertained, and the assignment of the respective parking space and/or a possible change of the parking space are made dependent on the available range of the individual vehicles. The available range of a vehicle is in particular described by a residual fuel amount or a charge state of the vehicle.

According to the present invention, a method for the optimized use of a parking area is provided, vehicles which are to be parked on the parking area each being assigned a free parking space. The vehicles navigate to the respective assigned parking space, in particular autonomously.

An optimized use of a parking area within the context of the present invention means in particular that the area available for parking may be occupied with a maximum number of vehicles and/or that the vehicles are positioned in such a way that a pick-up duration, i.e., the time during which the vehicles travel from their respective parking position to a defined pick-up position, is being minimized. In addition, further variables may be optimized, such as the number of re-parking processes carried out, the fuel consumption and/or the paths within the parking area traveled by the vehicles.

Autonomously within the context of the present invention means in particular that the vehicle navigates or drives independently, i.e., without an intervention of a driver. The vehicle thus drives independently on the parking area, without a driver having to steer the vehicle for this purpose. The driver no longer has to be personally present in the vehicle. Such an autonomously driving vehicle, which is able to automatically park and unpark, is also referred to as an AVP vehicle, for example. AVP stands for "automatic valet parking" and may be referred to as an "automatic parking process." Vehicles which do not have this AVP functionality are referred to as normal vehicles, for example.

During the parking duration on the parking area, it is provided that the parked vehicles, in particular autonomously, carry out a change of the parking space to enable an improved use of the available parking area or a faster availability of a vehicle. This automatic re-parking may take place as needed to enable an optimized use of the parking area.

According to the present invention, an available range is ascertained for each vehicle, and the assignment of the respective parking space and/or a possible re-parking process are carried out as a function of the available range of the individual vehicles.

With every new arrival of a vehicle, the present parking spot positions of the vehicles present on the parking area, i.e., already parked, are checked to the effect that an optimization of the overall parking spot utilization with respect to the use of the available parking space and, for example, the duration of pick-up processes, may be carried out. For this purpose, for example, available pieces of information with respect to established pick-up times and pick-up locations may additionally be taken into consideration.

The available range of a vehicle is preferably described by a residual fuel amount and/or a charge state of the vehicle. In the case of a vehicle which is operated by an internal combustion engine, the remaining available range which this vehicle is able to travel is decisively determined by the residual fuel amount present in the tank. In the case of a vehicle including a hybrid drive, alternatively or additionally the charge state of the battery is crucial. In the case of a vehicle including an electric drive, the present charge state of the battery is decisive for the remaining available range which this vehicle is able to travel.

The available range of a vehicle is particularly preferably newly determined by a calculation model for ascertaining the fuel consumption and/or the power consumption of a vehicle from a given starting position until reaching the destination, for example of a re-parking process of the vehicle, prior to and/or after the re-parking process. The calculation model for ascertaining the fuel consumption and/or the power consumption may for this purpose take, for example, the path length to be traveled and additionally instantaneous surroundings conditions, such as the temperature and/or condition of the passageway, into consideration in that corresponding data are made available by the vehicle and/or by a central control unit of the parking area. Moreover, concluded and upcoming holding times of the vehicle may be taken into consideration, as well as the chronological progression of the surroundings conditions, such as temperature, for example. These chronological progressions may in particular influence the charge state and the power consumption of a vehicle driven electrically entirely or in a supporting manner. The calculation model for ascertaining the fuel consumption and/or the power consumption is preferably selected as a function of the vehicle type, so that advantageously vehicle type-induced differences in the fuel consumption or power consumption may be taken into consideration.

In particular, it is provided that the planned remaining parking duration of each parked vehicle is taken into consideration when carrying out the method according to the present invention for the optimized use of a parking area. In this way, for example, re-parking processes may advantageously be planned in such a way that vehicles having a short planned remaining parking duration are parked closer to a pick-up zone, so that the transfer to the pick-up zone after the parking duration has elapsed may preferably take place with short paths and a low number of necessary re-parking processes of other vehicles.

In particular, it is provided that the geometry of the parking area is taken into consideration when carrying out the method according to the present invention for the optimized use of a parking area. The natural boundaries of the parking area, such as fences or walls, are taken into consideration, and furthermore fixed obstacles, such as pillars or trees, are considered in carrying out the method. It is also possible to take provided driving directions (traffic lanes) and/or sidewalks for pedestrians into consideration.

In particular, it is provided that the vehicle geometry of each parked vehicle is taken into consideration when carrying out the method according to the present invention for the optimized use of a parking area.

Conventional calculation processes may be employed to optimize or minimize the number of re-parking processes, such as a Greedy algorithm or dynamic programming or genetic programming. In a further step, optimization may also be carried out with the boundary condition that not only the number of re-parking processes, but also the overall path length to be traveled, is optimized. As a subordinate optimization variable, it may be considered that the remaining range of each vehicle is always still sufficient to cover a previously defined remaining route. Such a remaining route may include, e.g., the distance from the parking area to the closest gas station or charging station. Furthermore, it may be pointed out to the driver, after taking charge of the vehicle, that he or she should refuel the vehicle.

In one further preferred embodiment of the present invention, characteristic variables of a vehicle, in particular the vehicle type and/or the vehicle geometry and/or the residual fuel amount and/or a charge state and/or the planned parking duration, may be transmitted in advance to a valet parking system. Furthermore, a reduction in the duration of a group re-parking maneuver (multiple vehicles must be moved) may be achieved in that the operator of the parking area offers a booking service, and the vehicles are registered via this service using the relevant characteristic variables even before they reach the drop-off zone of the parking area. In this way, it may advantageously be achieved that the optimized target position of a vehicle in the "parked group" (previously present vehicles on an area to be parked on) may be ascertained in advance, and the relevant re-parking or unparking processes may already be initiated prior to the actual drop-off of the vehicle, so that the newly arriving vehicle may be parked in a time-optimized manner.

According to one further aspect of the present invention, a valet parking system is provided which is designed to carry out the method according to the present invention for the optimized use of a parking area as described above. For this purpose, the valet parking system may include a central control unit, which is designed to ascertain the residual range of a vehicle upon its arrival. For this purpose, it may be provided, for example, that the vehicle transmits its present residual fuel amount or its charge state via suitable communication means to the central control unit. With the aid of a calculation model, which in particular is adapted to the particular vehicle type, the central control unit may ascertain the residual range of each vehicle at any point in time of the parking duration, and accordingly plan the assignment of the respective parking space and possible re-parking processes.

The valet parking system may in particular include an installation for refueling and/or for charging a vehicle, so that the driver may directly refuel after picking up his/her vehicle. It is also possible that an electrically operated vehicle autonomously drives to an installation for charging its battery or its rechargeable battery (charging station) in a timely manner prior to a planned pick-up time, and is charged there, so that the vehicle may be transferred to the driver in a fully charged state at pick-up.

The method and system according to the present invention allow the optimization of the use of a given parking area for valet parking systems to the effect that a maximization of the parking capacities is achieved, taking the residual range into consideration, in particular the fuel amount still present in the vehicle or the present charge state of the vehicle. At this time, an important approach of a valet parking system for maximizing the parking capacity is to densely park the vehicles, so that these may only be unparked again by moving other vehicles. Since such a re-parking for parked vehicles may quite possibly take place several times (a day) over the parking duration (e.g., weeks in the case of a vehicle parked at the airport), the fuel amount still present in the vehicle or the charge state of the vehicle must be considered in the selection of a parking spot.

The present application thus describes a method for the optimized selection of a target position as a function of the parking duration to be expected and the residual range. In this way, system crashes of an automatic valet parking process due to disabled vehicles, whose tank or battery is empty, may be avoided.

DETAILED DESCRIPTION OF EXAMPLE EMBODIMENTS

Figure 1:
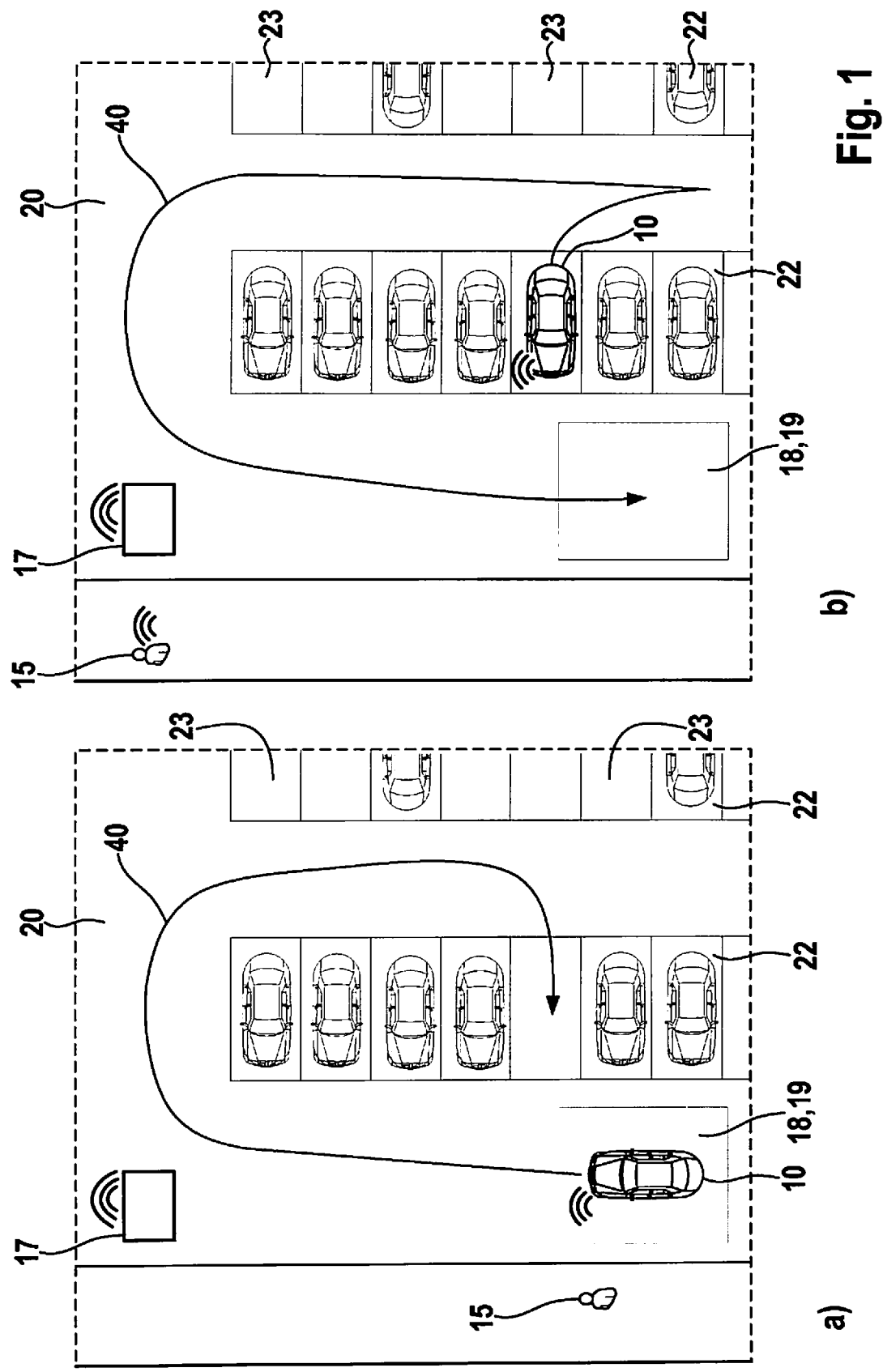
FIG. 1 schematically illustrates a valet parking process, FIG. 1 a) showing the situation during the drop-off of the vehicle, and FIG. 1 b) showing the pick-up process.

FIG. 1 shows a section of a parking area 20 including a plurality of parking spaces 23 in a schematic top view. The schematic illustration shows a parking area 20 as an open area, it also being possible to apply the present invention to parking garages, blocks of garages and underground parking garages.

Parking area 20 includes a transfer zone 18, in which a vehicle 10 may be transferred to the operator of parking facility 20. For this purpose, driver 15 of vehicle 10 drives his/her vehicle 10 to transfer zone 18, leaves his/her vehicle 10, and transfers his/her vehicle 10 to the operator of parking area 20.

After vehicle 10 has been transferred to the operator of parking area 20, vehicle 10 is assigned a free parking space 24 out of the possible parking spaces 23 as the parking position by a central control unit 17. Already occupied parking spaces are denoted by reference numeral 22 in FIG. 1.

After having been assigned the parking position, vehicle 10 is moved to assigned free parking space 24. Vehicle 10 is configured to carry out a driving maneuver autonomously with the aid of a parking assistance system. Central control unit 17 is granted access to the parking assistance system, so that vehicle 10 is able to autonomously move on parking lot 10 and automatically navigates to parking position 24. For example, corresponding pieces of information are transmitted from central control unit 17 to vehicle 10 so that vehicle 10 may be autonomously guided along a trajectory 40 within parking facility 20 based on the pieces of information. This situation is shown in FIG. 1 a).

If driver 15 intends to pick up his or her vehicle 10 again, the request of the driver is transmitted to the parking assistance system of vehicle 10 by central control unit 17. For this purpose, the driver may communicate, for example with the aid of a smart phone application, his or her intent to central control unit 17, which transmits a start signal and, if necessary, a trajectory 40, to vehicle 10. Additionally, further pieces of information, such as the position of the desired pick-up zone 19, may be transmitted. The vehicle thereupon automatically navigates to pick-up zone 19, moving along trajectory 40. This situation is shown in FIG. 1 b). In the depicted exemplary embodiment, transfer zone 18 and pick-up zone 19 coincide. Alternatively, for example, spatially separate transfer zones and pick-up zones may be provided.

In general, such valet parking methods are conventional. According to the present invention, it is now additionally provided that an available range is ascertained for each vehicle 10 by central control unit 17, and the assignment of respective parking space 24 and/or a possible re-parking process are carried out as a function of the available range of the individual vehicles involved in the particular process.

Figure 2:
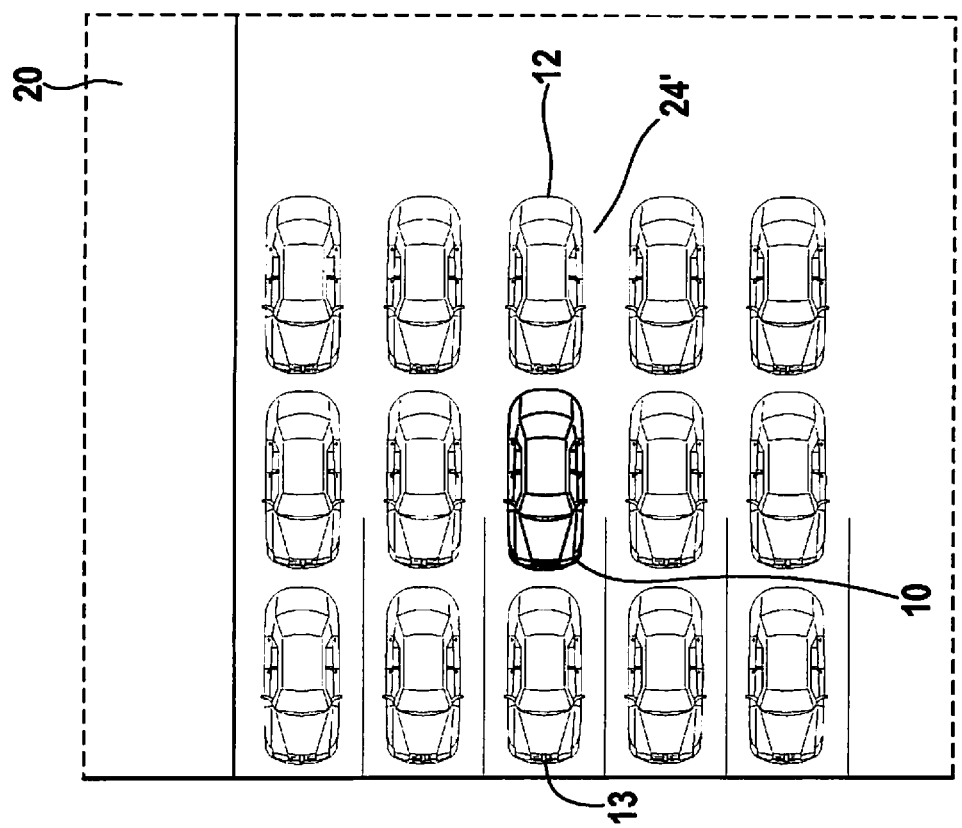
FIG. 2 schematically illustrates a re-parking process as part of the method according to the present invention.
Figure 2:
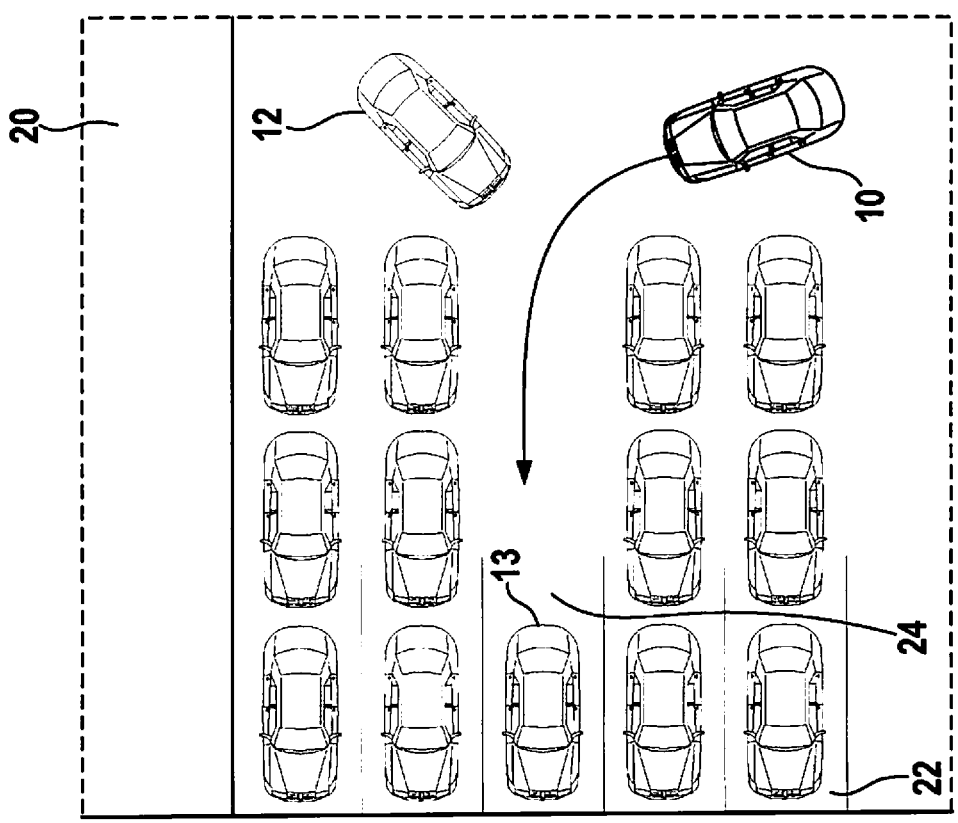

FIG. 2 shows a re-parking process, as it may be provided according to one embodiment of a method according to the present invention for the optimized use of parking area 20. Newly arriving vehicle 10, which hereafter is referred to as "ego-vehicle," is to be parked in an assigned parking space 24. Parking space 24 is situated in a center position of three rows of parked vehicles. FIG. 2 a) shows the moving of ego-vehicle 10 into parking space 24, the previously parked vehicle 12 having previously been unparked to make shown parking space 24 accessible to ego-vehicle 10. One reason for positioning ego-vehicle 10 in such a way could be, e.g., that the planned parking duration of vehicle 12 elapses prior to that of ego-vehicle 10, vehicle 13 situated in front of ego-vehicle 10 being parked for even longer. After vehicle 10 has reached its assigned parking space 24 and has been parked there, vehicle 12 drives to a parking space 24' behind vehicle 10. In particular, all re-parking processes take place autonomously. According to the present invention, the re-parking process is carried out as a function of the available range of individual vehicles 10, 13, the available range of a vehicle 10, 13 being described by a residual fuel amount and/or a charge state of the vehicle.

What is claimed is:

1. A method for the optimized use of a parking area, the method comprising:

assigning, via a central control unit, each of a plurality of vehicles which are to be parked on the parking area a respective parking space;

navigating, based on control data of the central control unit and a parking assistance system, for each of the vehicles, autonomously to the respective assigned parking space;

carrying out, via the central control unit and the parking assistance system, for each of the vehicles, a change of the parking space enable a maximum number of the vehicles being parkable in the available parking area and minimizing a pick-up duration, which is a time during which a corresponding vehicle travels from its parking position to a pick-up position;

ascertaining, via the central control unit, an available range for each of the vehicles, wherein the assignment of the respective parking space and an automatic re-parking in another parking space within the parking area is carried out as a function of the available range of the individual vehicles;

wherein characteristic variables of a vehicle, including at least one of a vehicle type and a vehicle geometry, and at least one of a residual fuel amount and a planned parking duration, are transmitted in advance, wherein the available range of a vehicle is newly determined at least one of prior to and after, the re-parking process by a calculation model for ascertaining at least one of a fuel consumption of the vehicle and a power consumption of a vehicle, from a starting position until reaching the destination of a re-parking process of the vehicle, wherein a number of re-parking processes is minimized with the aid of a calculation process, the calculation processing including one of Greedy, dynamic programming, or genetic programming, and wherein an optimization with boundary conditions is performed to provide that a number of re-parking processes and an overall path length to be traveled is optimized, and as a subordinate optimization variable, it is considered that a remaining range of each vehicle is sufficient to cover a previously defined remaining route.

2. The method as recited in claim 1, wherein the available range of a vehicle is described by at least one of a residual fuel amount of the vehicle and a charge state of the vehicle.

3. The method as recited in claim 1, wherein the calculation model is dependent on a vehicle type.

4. The method as recited in claim 1, wherein a planned remaining parking duration of each parked vehicle is taken into consideration.

5. The method as recited in claim 1, wherein a geometry of the parking area is taken into consideration.

6. The method as recited in claim 1, wherein a vehicle geometry of each parked vehicle is taken into consideration.

7. A valet parking system for optimizing use of a parking area, comprising:
   a central control unit configured to perform the following:
   assigning, via the central control unit, each of a plurality of vehicles which are to be parked on the parking area a respective parking space;
   navigating, based on control data of the central control unit and a parking assistance system, for each of the vehicles autonomously to the respective assigned parking space;
   carrying out, via the central control unit and the parking assistance system, for each of the vehicles, a change of the parking space to enable a maximum number of the vehicles being parkable in the available parking area and minimizing a pick-up duration, which is a time during which a corresponding vehicle travels from its parking position to a pick-up position;
   ascertaining, via the central control unit, an available range for each of the vehicles, wherein the assignment of the respective parking space and an automatic re-parking in another parking space within the parking area is carried out as a function of the available range of the individual vehicles;
   wherein characteristic variables of a vehicle, including at least one of a vehicle type and a vehicle geometry, and at least one of a residual fuel amount and a planned parking duration, are transmitted in advance,
   wherein the available range of a vehicle is newly determined at least one of prior to and after, the re-parking process by a calculation model for ascertaining at least one of a fuel consumption of the vehicle and a power consumption of a vehicle, from a starting position until reaching the destination of a re-parking process of the vehicle, and
   wherein a number of re-parking processes is minimized with the aid of a calculation process, the calculation processing including one of Greedy, dynamic programming, or genetic programming, and
   wherein an optimization with boundary conditions is performed to provide that a number of re-parking processes and an overall path length to be traveled is optimized, and as a subordinate optimization variable, it is considered that a remaining range of each vehicle is sufficient to cover a previously defined remaining route.

8. The valet parking system as recited in claim 7, further comprising:
   an installation for at least one of refueling a vehicle and charging a vehicle.

\* \* \* \* \*